July 13, 1937.   B. PASCOLESCO   2,087,069
BABY CARRIAGE
Filed Aug. 21, 1935   3 Sheets-Sheet 2
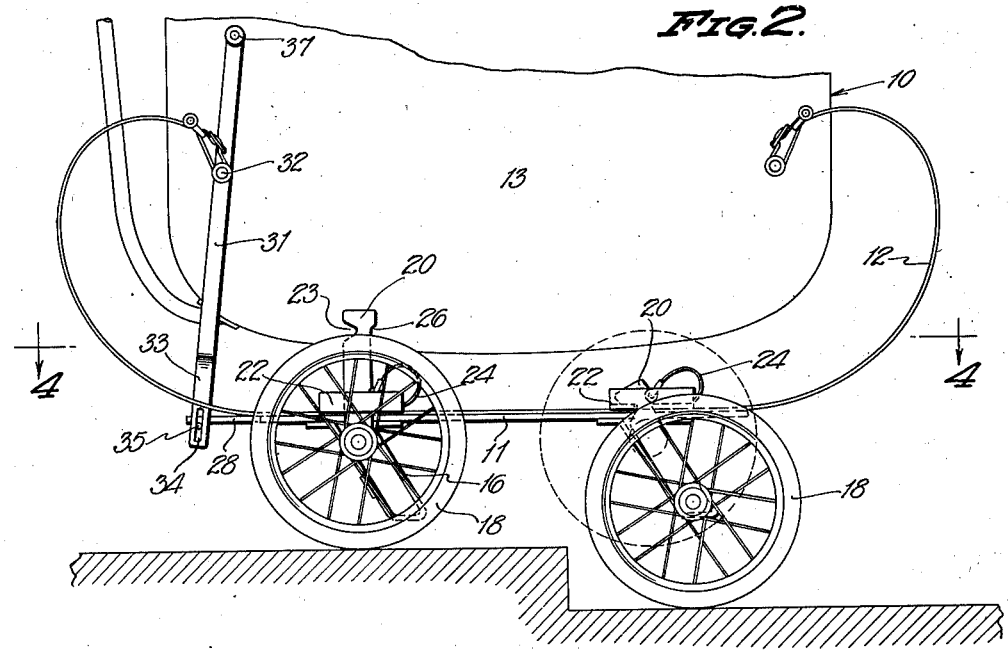
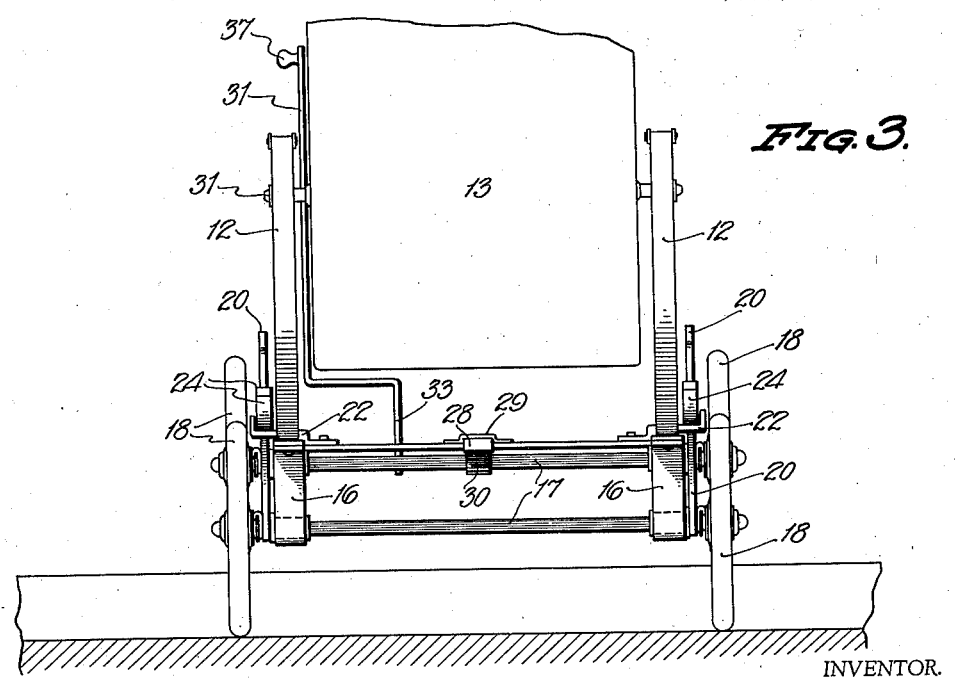
INVENTOR.
BOUCOUR PASCOLESCO
BY
ATTORNEYS.
WITNESS:

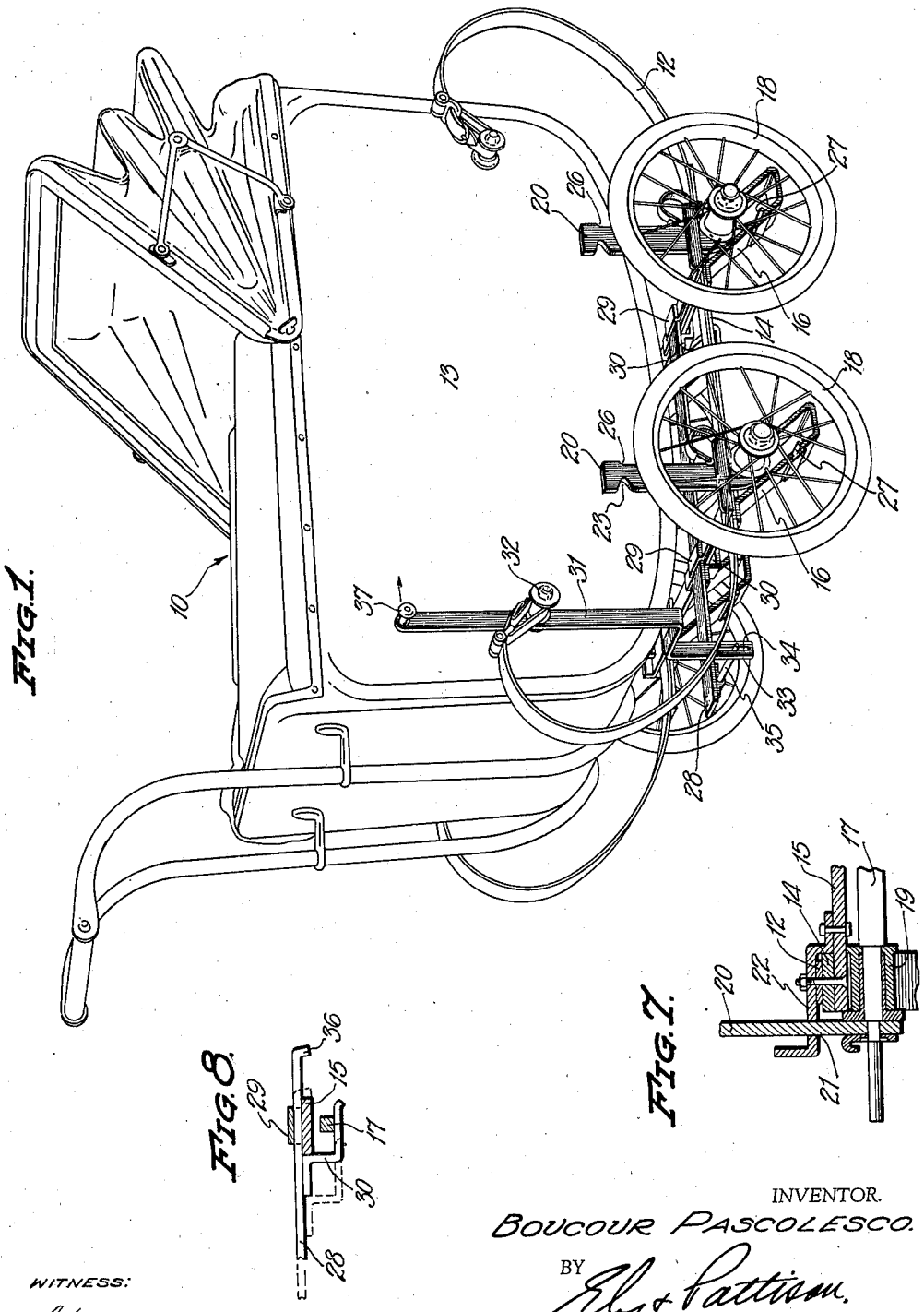

July 13, 1937.  B. PASCOLESCO  2,087,069
BABY CARRIAGE
Filed Aug. 21, 1935  3 Sheets-Sheet 3
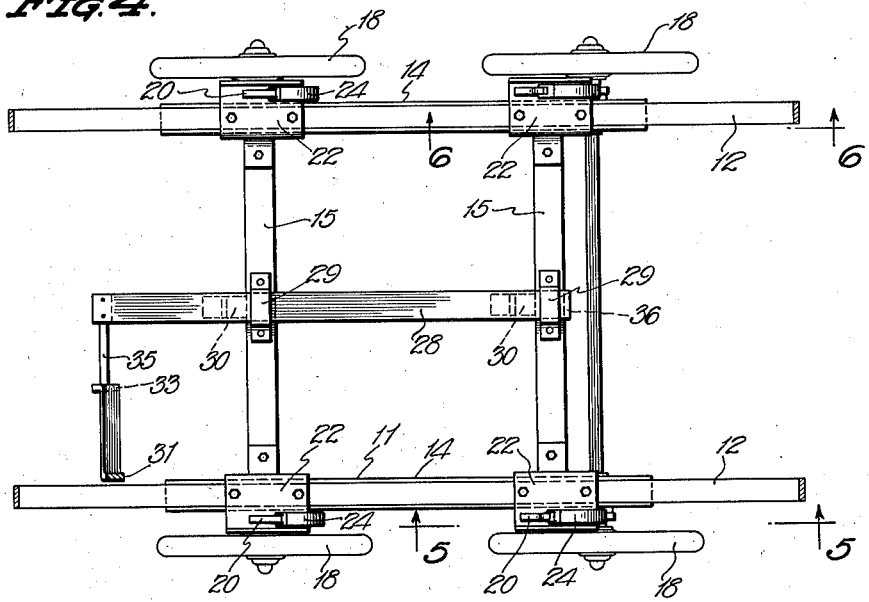
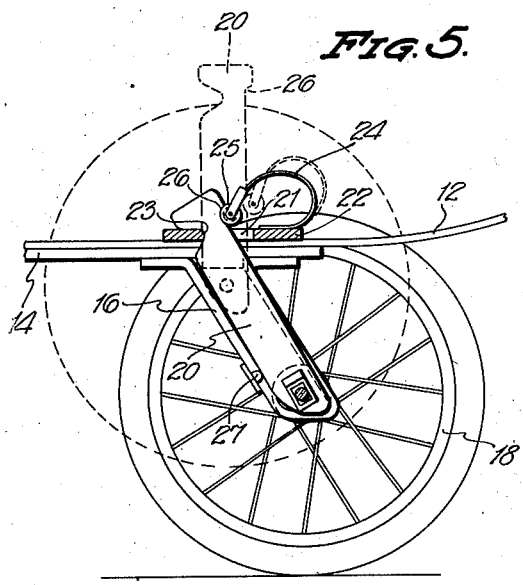
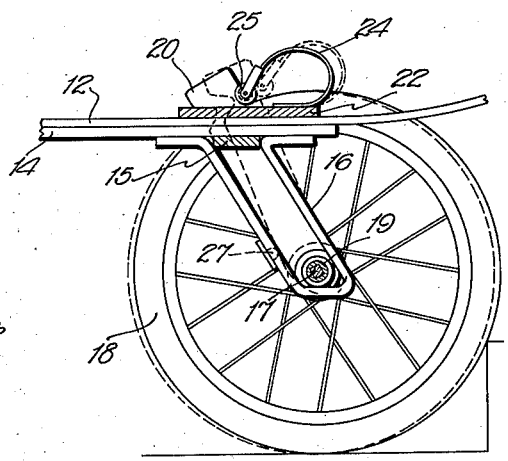
INVENTOR.
BOUCOUR PASCOLESCO.
BY Ely & Pattison
ATTORNEYS.
WITNESS:

Patented July 13, 1937

2,087,069

UNITED STATES PATENT OFFICE 2,087,069

BABY CARRIAGE

Boucour Pascolesco, New York, N. Y., assignor to Jeannette Pascoo, New York, N. Y.

Application August 21, 1935, Serial No. 37,110

8 Claims. (Cl. 280—43)

This invention relates to improvements in baby carriages, or like wheeled vehicles.

The primary object of the invention resides in a mechanism for use upon baby carriages or other like push type wheel vehicles which will enable the vehicle to descend and ascend a curb without necessitating the tilting of the vehicle, thus maintaining the body of the vehicle on a horizontal plane at all times, adding to the comfort of a baby within the body of a baby carriage, or to the storage of a load carried by any other like type of vehicle.

Another feature of the invention is to provide a mechanism wherein the wheels of a vehicle drop by gravity when the same is descending a curb and which are moved up inclined planes when the vehicle is ascending a curb, the movement of the wheels from one plane to another being gradual so as not to impart undue shocks or vibration to the body of the vehicle during such interval of movement.

A further feature of the invention is the provision of a novel means of releasably locking the wheels in a lowered position whereby contact of the wheels with a curb to be ascended will automatically release the locking means to enable the return of the wheels to a raised position upon a continuous forward pushing movement of the vehicle, thus eliminating the use of manually operable means for such release or the use of other extraneous parts.

With these and other objects in view, the invention resides in the certain novel construction, combination, and arrangement of parts, the essential features of which are hereinafter fully described, are particularly pointed out in the appended claims, and are illustrated in the accompanying drawings, in which:

Figure 1 is a perspective view of my invention in use upon a baby carriage.

Figure 2 is a side elevational view of a baby carriage with the front wheels in lowered position and the rear wheels in raised position.

Figure 3 is a front elevational view.

Figure 4 is a horizontal sectional view on the line 4—4 of Figure 2.

Figure 5 is a vertical sectional view on the line 5—5 of Figure 4 and showing in dotted lines, the position of the parts when a wheel is in raised position.

Figure 6 is a vertical sectional view on the line line 6—6 of Figure 4 showing in dotted lines the position of the wheel during disengagement of the releasable locking means.

Figure 7 is a detail vertical sectional view through one of the axles and its related parts.

Figure 8 is a detail sectional view illustrating the manner in which an axle is releasably held in raised position.

Referring to the drawings by reference characters, the numeral 10 designates a four wheel vehicle in the nature of a baby carriage and which includes a chassis 11, springs 12, and a body 13 supported by the springs, the springs in turn being fixedly connected to the chassis 11. The chassis 11 includes parallel side rails 14—14 and transverse cross rails 15—15.

Fixedly attached to the side rails 14—14 and extending downwardly and forwardly therefrom are front and rear sets of slotted hangers 16. The hangers of each set are transversely alined to respectively receive the front and rear axles 17. The axles 17 extend through the slotted hangers 16 and carry wheels 18 at the extending ends thereof. Mounted on that portion of the axle passing through the hangers are rollers 19 and which are of a diameter to permit free sliding movement of the axles between the downwardly inclined walls of the slotted hangers 16.

Fixed to the axles 17 outwardly of the hangers 16 are catch arms 20, the upper ends of which extend through slots 21 provided in catch plates 22, which plates are fixedly secured to the cross rails 15 of the chassis frame. The upper ends of the arms 20 are each provided on one side with a notch 23 for interengagement with a wall of the slot 21 in the keeper plate 22 for locking the wheels in lowered position and for the purpose of maintaining the arms in locked position, I provide springs 24 fixed to the keeper plates 22 and which springs carry rollers 25 in bearing contact with that side of the arms 20 opposite to that in which the notches 23 are formed. The upper end of the bearing surface engaged by the rollers 25 terminates in a shoulder or stop 26. When the catch arms 20 are in locking position as shown in Figure 5, they abut outwardly extending trip pins 27, the purpose of which is to engage the catch arms 20 to move the same out of locking engagement with the keeper plates 22 against the action of the springs 24 in a manner to be presently explained.

From the description thus far, it is apparent that each axle 17 is movable to raised and lowered positions within the range of the slots provided in the hangers 16, and as the means for locking the axles in lowered position has been described, I shall now explain the manner in which the axles are held in raised position. For this purpose, I provide a slide bar 28 extending longitudinally of the chassis frame and centrally thereof, the said bar being mounted in brackets 29 provided on the cross rails 15. Fixed to the under side of the slide bar 28 are Z-shaped keepers 30, which when the bar is moved to the limit of its movement in a forward direction, underlie the axles 17 and support the axles and their wheels in a raised position. It will be understood that movement of the slide bar 28 rearwardly, will effect a release of the axles by reason of the fact that the Z-shaped keepers 30 move to a position clear of the path of movement of the axles as illustrated in dotted lines in Figure 8 of the drawings. For the purpose of actuating the slide bar 28 to locking and release positions, I provide an actuating lever 31 which is pivoted to one side of the carriage body 13 as at 32, the pivot in this instance constituting the anchorage for the right hand spring 12. The lower end of the actuating lever 31 is offset as at 33 and the offset portion is provided with an elongated slot 34 through which a pin 35 extends, the said pin being secured to the rear end of the slide bar 28. The front end of the slide bar 28 is bent angularly as at 36 to engage the front cross rail 15 to limit movement of the slide bar in a releasing direction.

Assume that the carriage 10 is being pushed along a side walk, and the front and rear sets of wheels are in raised position as shown in Figure 1 of the drawings. In the event that it is desired to cross a street, the operator of the vehicle pushes forwardly upon the actuating handle 37 of the lever 31, thus causing the slide bar 28 to move the keepers 30 to releasing position, both sets of wheels now being free to drop as the wheels clear the curb to be descended. As the front set of wheels clear the curb as shown in Figure 2 of the drawings, they drop by gravity together with their axle and rest upon the lower street level, the front wheels being locked against upward movement by reason of the arm 20 engaging the walls of the slots of the keeper plates 22 as illustrated in Figure 5. Continued forward movement of the baby carriage will cause the rear set of wheels to clear the curb, and as the rear wheels do clear the curb, they likewise drop by gravity to lowered position and become locked in the same manner as the front wheels previously explained. In descending the curb, it will be appreciated that the body 13 of the carriage has remained in a horizontal position and will continue in such position as the carriage is pushed forwardly, and even during the ascension of a curb now to be explained. It will be remembered that both the front and rear sets of wheels are in lowered position, and as the front set of wheels strikes the curb to be ascended as shown in Figure 6 of the drawings, the front axle will move rearwardly, causing the front set of arms 20 to strike the respective pins 27, thus kicking or disengaging the notches 23 from the keeper plates 22 as shown in dotted lines in Figure 6. Thus the releasable locking means has been actuated to released position and further pushing of the vehicle causes the axle to ride up the inclined plane formed by the slots in the hangers 16. After the front wheels have thus been raised, the rear wheels come in contact with the curb and are likewise moved to a raised position, whereupon the wheels have now rolled onto the upper level or sidewalk and the operator grasps the manipulating handle 37 and pulls the same rearwardly causing the latch bar 28 to move forwardly so that the keepers 30 engage beneath the respective axles 17.

From the foregoing description it will be seen that I have constructed a wheel vehicle wherein the front and rear sets of wheels drop by gravity when passing from a high level to a low level, and the wheels are locked against upward movement until such time as they strike an obstruction to cause actuation of the releasable lock means. It is only necessary for the operator to actuate the lever 31 prior to descending the curb and to return the lever to normal position after the curb has been ascended. It will also be noted that the invention is built in the chassis of the vehicle and in no way effects or detracts from the artistic appearance of the vehicle body.

While I have shown and described what I deem to be the most practical embodiment of my invention, I wish it to be understood that such changes and modifications as come within the scope of the appended claims may be resorted to if desired.

Having thus described the invention, what I claim as new and desire to secure by Letters Patent of the United States, is:—

1. In a wheel vehicle having a chassis, front and rear sets of wheels, means on said chassis for supporting said sets of wheels for inclined sliding movement to raised and lowered positions, manually operated means for releasably locking said wheels in raised position, and automatic means for releasably locking said wheels in lowered position when lowered by gravity upon actuation of said manually operated means to releasing position.

2. In a wheel vehicle having a chassis, front and rear sets of wheels, means on said chassis for slidably supporting said sets of wheels for movement to raised and lowered positions, manually operated means for releasably locking said wheels in raised position, automatic means for releasably locking said wheels in lowered position when lowered by gravity upon actuation of said manually operated means to releasing position, and means operable upon striking contact of said sets of wheels with an obstruction in their path of forward turning movement to release the automatic locking means to allow the sets of wheels to return to a raised position.

3. In a wheel vehicle having a chassis and a body mounted thereon, front and rear sets of wheels, means on said chassis for slidably supporting said sets of wheels and for limiting the sliding movement of the same to a raised position and a lowered position, manually operable means for releasably supporting said sets of wheels in a raised position, said sets of wheels dropping by gravity to a lowered position upon release of said manually operable means when the sets of wheels successively clear the edge of a curb when passing from one level to a lowered level, means for releasably locking said sets of wheels in a lowered position when dropped thereto, and means operable by successive contact of said sets of wheels with a curb during forward movement of the vehicle when the sets of wheels are in a lowered position to release the last mentioned means whereby continued forward movement of the vehicle will cause said sets of wheels to move upwardly to the level of the curb being ascended.

4. In a wheel vehicle having a chassis, front and rear sets of wheels, front and rear sets of downwardly and forwardly inclined hangers fixed to said chassis and in which said front and rear sets of wheels are respectively supported for inclined sliding movement to raised and lowered position, manually operable means for simultaneously releasably locking said front and rear sets of wheels in raised position, and individual means for respectively releasably locking said front and rear sets of wheels in lowered position when lowered by gravity upon actuation of said manually operated means to releasing position.

5. In a wheel vehicle, a chassis, sets of front and rear slotted hangers fixed to said chassis, each set of hangers being transversely alined, front and rear sets of wheels, the wheels of each set being mounted upon a transversely disposed axle, the axles of the front and rear sets of wheels respectively passing through the front and rear sets of slotted hangers for sliding movement to raised and lowered positions, a releasable latch bar slidably mounted upon said chassis and provided with means for underlying said axles when the sets of wheels are in raised position to hold the sets of wheels in such position, and means for releasably holding said sets of wheels in lowered position when moved thereto upon movement of said latch bar to releasing position.

6. In a wheel vehicle, a chassis, and a body mounted thereon, sets of front and rear slotted hangers fixed to said chassis, each set of hangers being transversely alined, front and rear sets of wheels, the wheels of each set being mounted upon a transversely disposed axle, the axles of the front and rear sets of wheels respectively passing through the front and rear sets of slotted hangers for sliding movement to raised and lowered positions, a releasable latch bar slidably mounted upon said chassis and provided with means for underlying said axles when the sets of wheels are in raised position to hold the sets of wheels in such position, an actuating lever pivoted to one side of said body and operatively connected to said latch bar to impart back and forth sliding movement thereto, and means for releasably holding said sets of wheels in lowered position when moved thereto upon movement of said latch bar to releasing position.

7. In a wheel vehicle, a chassis, front and rear sets of slotted hangers fixed to said chassis, the hangers of each set being disposed in transverse alinement, axles mounted in the respective sets of slotted hangers for free sliding movement and wheels at opposite ends thereof, releasable means engaging and holding the axles in raised position, and releasable spring actuated catch means for locking said axles in lowered position when moved thereto by gravity upon the release of said first mentioned releasable means.

8. In a wheel vehicle, a chassis, front and rear sets of slotted hangers fixed to said chassis, the hangers of each set being disposed in transverse alinement, axles mounted in the respective sets of slotted hangers for free sliding movement therein and wheels at opposite ends thereof, releasable means engaging and holding the axles in raised position, and individual releasable catch means for locking the respective axles in lowered position when moved thereto by gravity upon the release of said first mentioned releasable means, each individual releasable catch means including a pair of arms connected to an axle, slotted keeper plates mounted on said chassis through which said arms freely slide, said arms being notched for interlocking engagement with the walls of the slots of said slotted keeper plates when the axle is in lowered position, and spring means acting upon said arms to effect interlocking of the same with said keeper plates.

BOUCOUR PASCOLESCO.